US009338822B2

(12) United States Patent
Suzuki et al.

(10) Patent No.: US 9,338,822 B2
(45) Date of Patent: May 10, 2016

(54) COMMUNICATION METHOD AND COMMUNICATIONS APPARATUS

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Hiromasa Yamauchi, Usakos (NA); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 14/248,907

(22) Filed: Apr. 9, 2014

(65) Prior Publication Data

US 2014/0241277 A1    Aug. 28, 2014

Related U.S. Application Data

(63) Continuation of application No. PCT/JP2011/075850, filed on Nov. 9, 2011.

(51) Int. Cl.
*H04W 88/06* (2009.01)
*H04W 48/18* (2009.01)
*H04W 4/00* (2009.01)
*H04W 28/06* (2009.01)

(52) U.S. Cl.
CPC .............. *H04W 88/06* (2013.01); *H04W 48/18* (2013.01); *H04W 28/06* (2013.01)

(58) Field of Classification Search
CPC ...... H04W 88/06; H04W 48/18; H04W 28/06
USPC .......................................................... 370/329
See application file for complete search history.

(56) References Cited

U.S. PATENT DOCUMENTS

| 2007/0042733 A1* | 2/2007 | Tomioka ............... H04W 48/18 455/179.1 |
| 2007/0237036 A1 | 10/2007 | Koya et al. |
| 2007/0281617 A1* | 12/2007 | Meylan ................. H04W 16/14 455/41.2 |
| 2008/0051129 A1 | 2/2008 | Abe et al. |
| 2008/0095120 A1 | 4/2008 | Hong et al. |
| 2008/0200195 A1 | 8/2008 | Abe et al. |
| 2008/0212658 A1* | 9/2008 | Rofougaran ............. H03L 7/18 375/219 |

(Continued)

FOREIGN PATENT DOCUMENTS

| JP | 2003-283651 A | 10/2003 |
| JP | 2006-246115 A | 9/2006 |

(Continued)

OTHER PUBLICATIONS

U.S. Appl. No. 61/545,019 dated Oct. 7, 2011 has been attached as a NPL.*

(Continued)

*Primary Examiner* — Guang Li
*Assistant Examiner* — Faisal Choudhury
(74) *Attorney, Agent, or Firm* — Arent Fox LLP

(57) ABSTRACT

A communication method includes performing, by a processor, digital processing for radio communication by multiple communication schemes; combining based on an actual communication state and within a processing capability of the processor, one or more among the communication schemes; and performing concurrent communication.

8 Claims, 9 Drawing Sheets

(56) References Cited

U.S. PATENT DOCUMENTS

| | | | |
|---|---|---|---|
| 2008/0261649 A1 | 10/2008 | Mukai et al. | |
| 2010/0009627 A1* | 1/2010 | Huomo | H04B 5/0031 455/41.1 |
| 2010/0105425 A1* | 4/2010 | Asokan | H04B 1/406 455/552.1 |
| 2010/0112946 A1* | 5/2010 | Urushiyama | H04W 48/16 455/41.2 |
| 2010/0184405 A1* | 7/2010 | Chen | H04W 4/18 455/410 |
| 2011/0201347 A1* | 8/2011 | Abraham | H04W 48/18 455/456.1 |
| 2011/0222479 A1* | 9/2011 | Cyranka | H04J 11/004 370/328 |
| 2013/0089010 A1* | 4/2013 | Richardson | H04W 8/22 370/280 |

FOREIGN PATENT DOCUMENTS

| | | |
|---|---|---|
| JP | 2007-243716 A | 9/2007 |
| JP | 2008-104190 A | 5/2008 |
| JP | 2009-147956 A | 7/2009 |
| JP | 2010-113482 A | 5/2010 |
| JP | 2011-9964 A | 1/2011 |
| JP | 2011-166251 A | 8/2011 |
| WO | WO 2005/117473 A1 | 12/2005 |

OTHER PUBLICATIONS

Japanese Office Action for Japanese Application No. 2013-542753 dated Apr. 28, 2015 (partial translation of relevant portion).
International Search Report issued in PCT/JP2011/075850, mailed Dec. 13, 2011, 2 pages.
Japanese Office Action Issued on Feb. 3, 2015; Japanese Application No. 2013-542753, with partial English Translation.

* cited by examiner

FIG.2

| COMMUNI-CATION SCHEME | LOGIC COMMUNI-CATIONS CAPABILITY | SIGNAL STRENGTH | EFFECTIVE COMMUNICATIONS CAPABILITY (ESTIMATE) | REQUIRED PROCESSING CAPABILITY |
|---|---|---|---|---|
| SCHEME A | 12 Mbps | 0.4 | 4.8 Mbps (Y1) | 500 MHz |
| SCHEME B | 7 Mbps | 0.6 | 4.2 Mbps (Y2) | 400 MHz |
| SCHEME C | 5 Mbps | 0.7 | 3.5 Mbps (Y3) | 300 MHz |
| SCHEME D | 3 Mbps | 0.7 | 2.1 Mbps (Y4) | 200 MHz |
| SCHEME E | 1 Mbps | 0.6 | 0.6 Mbps (Y5) | 100 MHz |

FIG.3

| COMMUNICATION SCHEME COMBINATION | REQUIRED PROCESSING CAPABILITY | TOTAL EFFECTIVE COMMUNICATIONS CAPABILITY |
|---|---|---|
| A | 500 MHz | Y1 |
| B | 400 MHz | Y2 |
| C | 300 MHz | Y3 |
| D | 200 MHz | Y4 |
| E | 100 MHz | Y5 |
| B+E | 500 MHz | Y2+Y5 |
| C+D | 500 MHz | Y3+Y4 |
| C+E | 400 MHz | Y3+Y5 |
| D+E | 300 MHz | Y4+Y5 |

COMMUNICATION METHOD AND COMMUNICATIONS APPARATUS

CROSS REFERENCE TO RELATED APPLICATIONS

This application is a continuation application of International Application PCT/JP2011/075850, filed on Nov. 9, 2011 and designating the U.S., the entire contents of which are incorporated herein by reference.

FIELD

The embodiments discussed herein are related to a communication method and communications apparatus that combine multiple communication schemes to perform concurrent communication.

BACKGROUND

There are various types of radio communication schemes for mobile telephones, such as Global System for Mobile Communications (GSM) and CDMA, and communication schemes between communication carriers may differ. Communication schemes differ among terminal types, e.g., international roaming terminals and non-carrier-restricted sim-lock free terminals, and recently communication schemes even differ for the same carrier depending on the service provided. Consequently, terminals that can support more than one communication scheme are appearing.

The simplest method of supporting multiple communication schemes by a single terminal is to equip the terminal with processing circuits, such as baseband units, respectively corresponding each scheme that is to be supported. A terminal equipped with multiple processing circuits in this manner is called a multimode terminal. Techniques for efficiently determining the communication scheme to be used in such multimode terminals have been disclosed (for example, refer to Japanese Laid-Open Patent Publication No. 2009-147956).

Without disposing dedicated processing circuits for each communication scheme like the multimode terminal above, software defined radio (SDR) terminals use a processor to perform the digital processing portion of radio communications processing. SDR terminals have an advantage in that even if the number of supported communication schemes increases, the additional communication schemes can be accommodated without increases in the size of the circuit for digital processing in the processor, etc. because a common processor is used for processing under the different communication schemes.

Further, a technology has been disclosed in which a single terminal concurrently communicates with multiple base stations, thereby improving communication performance. For example, a technique has been disclosed in which multiple SDR communications units (digital baseband units) are disposed and communication is performed concurrently with plural counterparts (for example, refer to Japanese Laid-Open Patent Publication No. 2011-9964).

Nonetheless, with the technology recited in Japanese Laid-Open Patent Publication No. 2009-147956, dedicated processing circuits such as baseband units have to be disposed for each communication scheme and consequently, the size of the processing circuit increases according to the number of communication schemes and corresponding installation space is necessary. Further, with the technology recited in Japanese Laid-Open Patent Publication No. 2011-9964, although processing for different communication schemes can be performed commonly using a processor by a SDR communications unit, to concurrently communicate with multiple base stations, SDR digital baseband units equivalent in number to the number of concurrent communication counterparts are necessary. Consequently, the size of the circuit increases and corresponding installation space is necessary.

Although improved communication speed can be facilitated by a terminal concurrently communicating with multiple base stations, no technique has been proposed that includes different communication methods and obtains the optimal communication method(s) and the number of communications to be performed concurrently. Here, communications capability (communication speed) differs according to communication scheme, and the processing capability demanded of the processor differs. To cope with changes in the communication state with a base station consequent to movement, etc., the terminal has to perform high-speed communication under a communication state that is continually favorable.

Further, since the terminal is compact and batter-operated for portability, reductions in the number of processing circuits and installation space, as well as facilitation of low power consumption are necessary. However, with the conventional technologies, the processing described above to be performed efficiently and using the least amount of resources possible, i.e., communication by communication schemes among the communication schemes and enabling concurrent communication cannot be performed.

SUMMARY

According to an aspect of an embodiment, a communication method includes performing, by a processor, digital processing for radio communication by multiple communication schemes; combining based on an actual communication state and within a processing capability of the processor, one or more among the communication schemes; and performing concurrent communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a table depicting an example of communications capabilities, signal strengths, and required processing capabilities of communication schemes;

FIG. 3 is a table depicting a list of the required processing capabilities according to communication scheme combinations;

DESCRIPTION OF EMBODIMENTS

Figure 1:
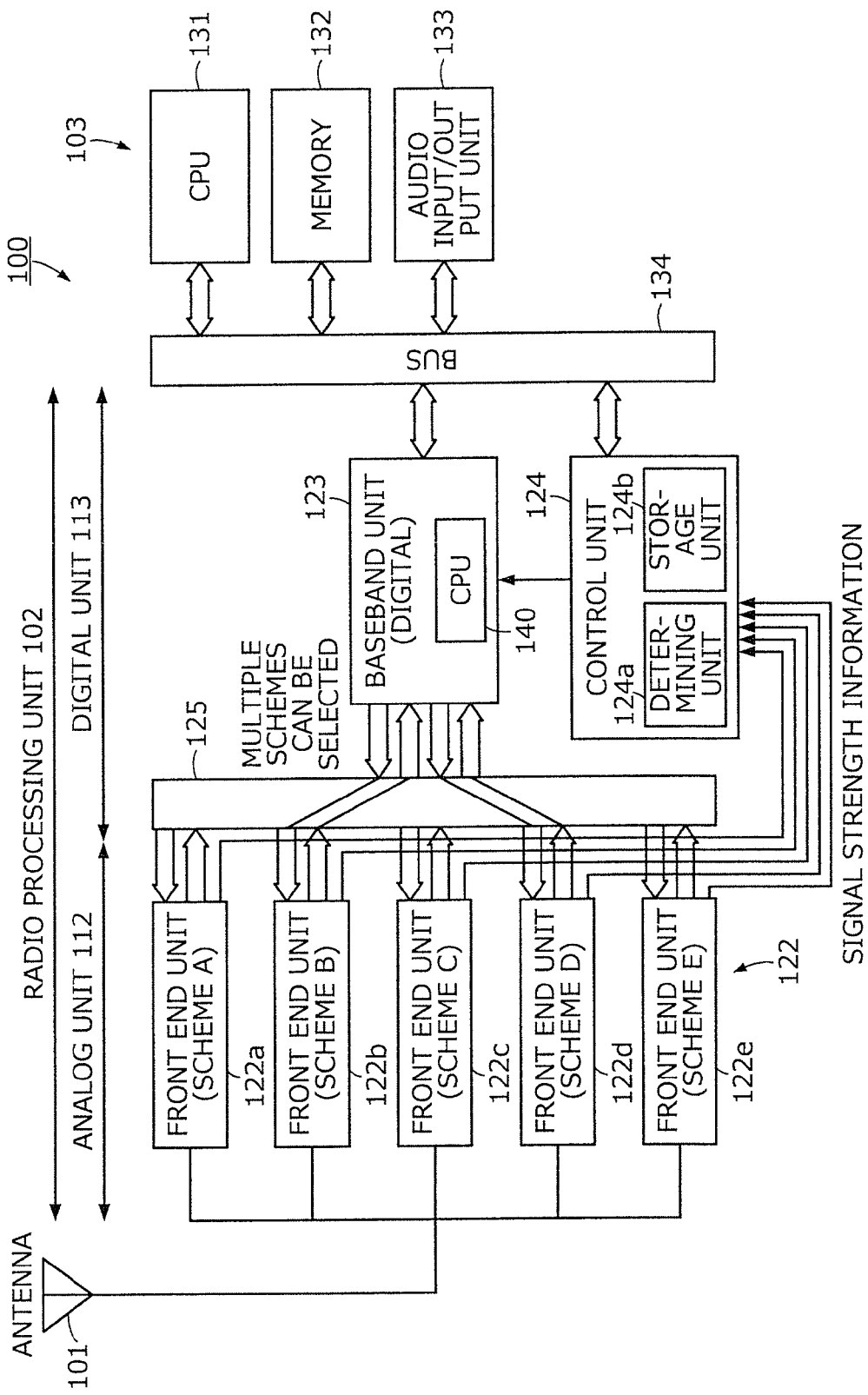
FIG. 1 is a diagram depicting a configuration of a communications apparatus according to a first embodiment.

Embodiments will be described in detail with reference to the accompanying drawings. FIG. 1 is a diagram depicting a configuration of a communications apparatus according to a first embodiment. The communications apparatus will be described taking a mobile terminal 100 such as a mobile telephone that performs radio communication with a base station, as an example. The terminal 100 includes an antenna 101, a radio processing unit 102, and a data processing unit 103.

The terminal 100 uses the radio processing unit 102 to convert a radio signal received from a base station, etc., via the antenna 101, from analog data to digital data; and performs data processing by the data processing unit 103. Data that is to be transmitted and has been data processed by the data processing unit 103 is input to the radio processing unit 102, converted from digital data into analog data by the radio processing unit 102, and transmitted from the antenna 101 to the base station, etc.

The radio processing unit 102 is separated into an analog unit 112 and a digital unit 113. The analog unit 112 performs modulation/demodulation processing, AD/DA conversion processing, etc. The digital unit 113 performs processing with respect to transmission data, such as dividing the transmission data; a protocol process of adding to the transmission data, appended information for communication with the base station; and adding error correction code. The digital unit 113 processes received data using error correction code to remove data errors arising consequent to noise, and combines separated data using appended information.

The analog unit 112 includes multiple front end units 122 to perform concurrent communication by multiple radio communication schemes. The front end units 122 supporting different communication schemes, e.g., GSM, CDMA, etc., are disposed. In the example depicted in FIG. 1, front ends 122a to 122e for five communication schemes (schemes A to E) are disposed. Concurrent communication by the different communication schemes is not limited to concurrent communication with multiple base stations and includes concurrent communication with a base station at a single location, by different communication schemes.

The digital unit 113 includes a baseband unit 123 that performs digital processing, a control unit 124 for controlling data transmission and reception, and a selecting unit (switch) 125. The control unit 124 obtains the signal strength of each communication signal from the front end units 122, i.e., signal strength information for communication signals from a base station. The control unit 124 selects a communication scheme (schemes A to E) that can be used and switches the communication path to that of a base station having strong signal strength. When performing the switch, the control unit 124 controls the selecting unit 125 and connects any one or more of the selected front end units 122 (122a to 122e) to the baseband unit 123.

As depicted in FIG. 1, according to the embodiment, the analog unit 112 has a front end unit 122 for each communication scheme, but the digital unit 113 uses the one baseband unit 123 to concurrently perform baseband processing for the multiple communication schemes. Although an internal configuration will be described hereinafter, the baseband unit 123 includes a processor (CPU) 140 and performs baseband processing by executing programs. Thus, the installation space occupied by the circuit configuring the baseband unit 123 in the terminal 100 is reduced, achieving size reductions and power saving.

The data processing unit 103 includes a processor (CPU) 131, the memory 132, an audio input/output unit 133, and a bus 134. The data processing unit 103, via the bus 134, is connected to the radio processing unit 102, and processes data that is input to and output from the radio processing unit 102. In addition to an audio telephone function and an email transmission/reception function of the terminal 100, data processing functions include various types of application functions. The audio input/output unit 133 is an input/output unit (e.g., microphone, speaker) for sound and is used for audio telephone calls. Keys for operating the terminal 100 and various sensors (not depicted) are connected to the bus 134.

The control unit 124 of the digital unit 113 includes a determining unit 124a that determines the combination of communication schemes (schemes A to E) to be used when concurrent communication is performed, and a storage unit 124b such as read-only memory (ROM) and random access memory (RAM). The determining unit 124a selects a communication scheme combination for which the total effective communications capability is greatest. When selecting the communication scheme combination, the determining unit 124a refers to setting information stored in the storage unit 124b and calculates effective communications capability (estimated value) based on measured signal strength and logic communications capabilities specific to the communication schemes.

The processing capability required of the processor 140 of the baseband unit 123 is determined corresponding to the logic communications capabilities specific to the communication schemes. Therefore, the determining unit 124a obtains from combinations of the required processing capabilities, communication schemes that are within the processing capability specific to the processor 140. Thereafter, for each of the communication scheme combinations, the determining unit 124a obtains the total effective communications capability calculated based on the measured signal strength, and selects a communication scheme combination having a high total effective communications capability. The determining unit 124a controls and instructs the baseband unit 123 to communicate with a base station(s) by the selected communication scheme combination. Thus, the processor 140 is effectively used and the communication speed of concurrent communication by multiple communication schemes can be increased.

During radio communication, when the signal strength from a base station becomes weak, the radio communication becomes susceptible to external noise and the communication speed drops. The relationship of effective communications capability (estimated value) with respect to the signal strength of communication schemes can by calculated based on actual signal strength measurement. In the storage unit 124b of the control unit 124, the logic communications capability of each communication scheme (front end unit 122) is set.

Even if the effective communications capability drops consequent to noise, the processing capability required of the processor 140 by each communication scheme does not change. Consequently, the required processing capability for each communication scheme can be preliminarily set in the storage unit 124b.

FIG. 2 is a table depicting an example of communications capabilities, signal strengths, and required processing capabilities of communication schemes. For example, the communication scheme is assumed to be scheme A; the logic communications capability is assumed to be 12 Mbps; and the signal strength measured by the terminal 100 is assumed to be 0.4. In this case, the determining unit 124a calculates the effective communications capability Y1 of scheme A to be =12×0.4=4.8 Mbps. Further, with scheme A, the processing capability required of the processor 140 is assumed to be 500 MHz.

In the example depicted in FIG. 2, although a calculation method has been simply described, the calculation method is not limited to using signal strength, and the precision in estimating the effective communications capability can be improved by using calculation coefficients for communication quality, interference state, etc. Further, although the required processing capability is assumed as the operating frequency (MHz) of the processor 140, a typical performance index for the processor 140, i.e., the process time (million instructions per second (MIPS)) may be used. Among setting information 200 depicted in FIG. 2, the logic communications capabilities and the required processing capabilities are values fixed for each communication scheme. The logic communications capabilities and the required processing capabilities are preliminarily set in the storage unit 124b, such as the ROM, of the control unit 124.

The determining unit 124a selects the combination having the greatest effective communications capability within the processing capability specific to the processor 140. For example, the processing capability specific to the processor 140 is assumed to be 500 MHz. Concerning the respective processing capabilities required by the communication schemes, the corresponding processing capabilities are assumed to be 500 MHz for scheme A, 400 MHz for scheme B, 300 MHz for scheme C, 200 MHz for scheme D, and 100 MHz for scheme E.

FIG. 3 is a table depicting a list of the required processing capabilities according to communication scheme combinations. Combination information 300 depicted in FIG. 3 indicates communication scheme combinations that can be selected for performing processing by the terminal 100, i.e., the processor 140. Combinations for which the required processing capability becomes less than or equal to 500 MHz, which is the operating frequency (processing capability) of the processor 140 are indicated. For example, since the required processing capability for scheme A is 500 MHz, when scheme A is selected, no other scheme is selected. Further, any one of the schemes A, B, C, D, and E can be independently selected. Combinations of two schemes B+E, C+D, C+E, and D+E are combinations that can be selected.

In this manner, since the required processing capability for each communication scheme is determined by the type (communication scheme) of the front end units 122, communication scheme combinations that can be selected by the terminal 100 according to the required processing capability and the processing capability of the processor 140, can be determined and fixed, as depicted in FIG. 3. The combination information 300 depicted in FIG. 3 is preliminarily set in the storage unit 124b of the control unit 124. Further, in FIG. 3, the total effective communications capability (Y1 to Y5) for each combination is indicated. The total effective communications capability varies with changes in signal strength and therefore, is not stored in the storage unit 124b.

The determining unit 124a obtains from the combination information 300, combination information for a communication scheme that can be used for communication. Based on signal strength information obtained from the front end unit 122, the determining unit 124a obtains the effective communications capability for each communication scheme. Combinations of the effective communications capabilities (communication schemes) within the processing capability specific to the processor 140 of the baseband unit 123 are determined. Here, the communication scheme combination that is as close as possible to the maximum processing capability specific to the processor 140 can increase the communication speed the most efficiently.

Figure 4:
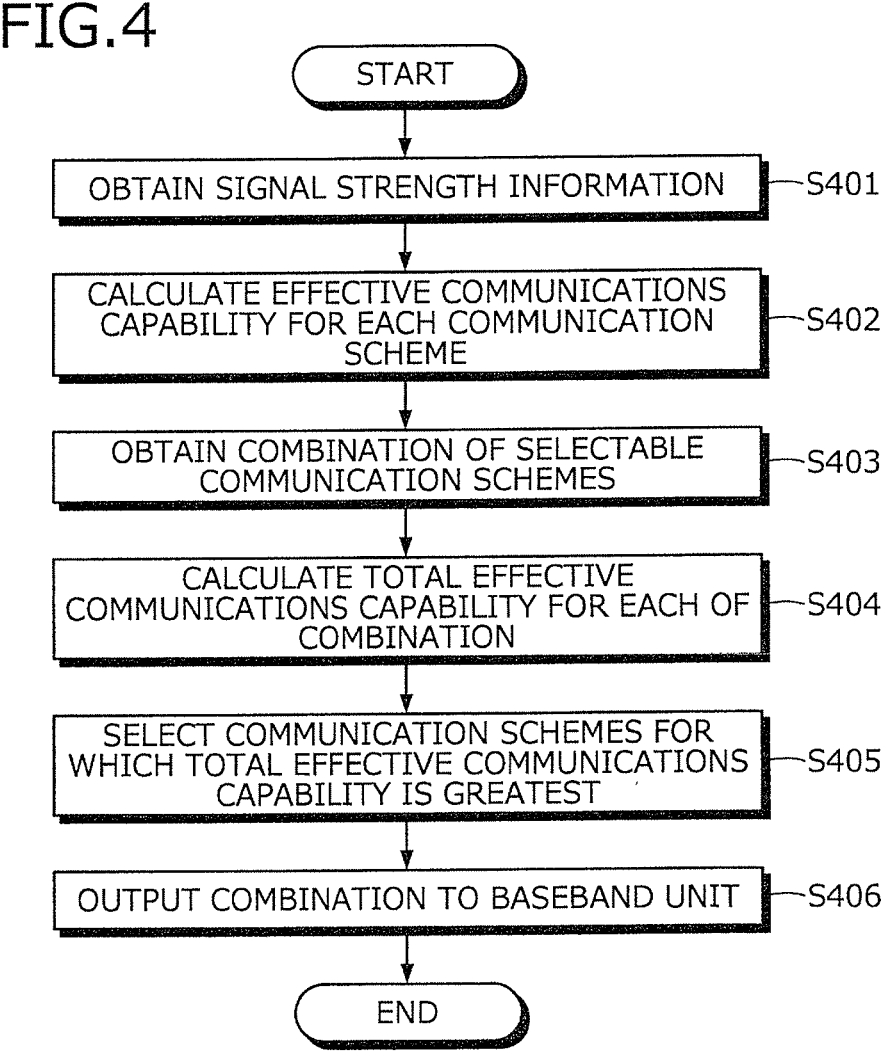
FIG. 4 is a flowchart depicting a communication scheme selection process according to the first embodiment.

Next, a process related to the selection (by the determining unit 124a) of communication schemes capable of concurrent communication, will be described. FIG. 4 is a flowchart depicting a communication scheme selection process according to the first embodiment. The process depicted in FIG. 4 is executed by the determining unit 124a in the control unit 124.

The determining unit 124a obtains signal strength information for communication signals from the front end units 122 (122a to 122e) disposed respectively for communication schemes (scheme A to E) (step S401). The determining unit 124a refers to the settings in the storage unit 124b, obtains the relationship between measured signal strength and the logic communications capability of each communication scheme (refer to FIG. 2), and calculates the effective communications capability for each communication scheme (step S402).

The determining unit 124a refers to the settings in the storage unit 124b and obtains a combination (refer to FIG. 3) of communication schemes (schemes A to E) selectable by the terminal 100 (step S403). As described with reference to FIG. 3, the processing capability required of the processor 140 by each communication scheme (scheme A to E) is determined and fixed. Therefore, based on the required processing capabilities, the processing capability specific to the processor, and the types (communication scheme) of the front end units 122 communicable with the base station, a communication scheme combination that can be selected by the terminal 100 is selected from among preliminarily set combinations (FIG. 3).

The determining unit 124a calculates the total effective communications capability for each of the combinations obtained at step S403 (step S404). As depicted in FIG. 3, the determining unit 124a calculates each total effective communications capability (Y1 to Y5 depicted in FIG. 3) by summing the effective communications capabilities for each possible communication scheme combination. The determining unit 124a selects from among the combinations, the communication schemes for which the total effective communications capability is greatest (step S405). For example, based on the effective communications capabilities depicted in FIG. 3, the total effective communications capability for schemes C+D is 5.6, which is the greatest, and thus, schemes C+D are selected.

Here, when multiple combinations respectively have the greatest total effective communications capability, a combination for which the total required processing capability is small is selected. For example, assuming that the effective communications capabilities for scheme B and schemes C+D are respectively 5.6, in this case, the required processing capability for scheme B alone is 400 MHz, whereas, the total required processing capability for schemes C+D is 300+200 MHz=500 MHz and therefore, scheme B is selected.

For example, when a base station that communicates by schemes D and E is not nearby, the signal strength is assumed to become 0 and the effective communications capabilities (Y4, Y5) for schemes D and E are respectively 0. In this case, if the effective communications capability for scheme C is the greatest among the combinations, then not only is the effective communications capability for scheme C the greatest, but the total effective communications capabilities respectively for schemes C+D and schemes C+E also have the greatest value. Here, since the required processing capability for scheme C is 300 MHz; the total required processing capability for schemes C+D is 500 MHz; and the total required processing capability for schemes C+E is 400 MHz; scheme C, which has the smallest total value, alone is selected.

The determining unit 124a (the control unit 124) outputs to the baseband unit 123, combination information (communication schemes used for communication) concerning the selection (step S406), ending a series of operations. The baseband unit 123 controls the selecting unit 125 to perform switching such that the front end units 122 of the communication schemes corresponding to the received combination information are connected to. Switching control of the selecting unit 125 may be performed directly by the control unit 124.

The communication state between a base station and the terminal 100 changes consequent to structures and geographical features, the weather, signal interference, and changes in the distance between the terminal 100 and the base station resulting from movement of the terminal 100. Further, changes in the communication state may present as changes in signal strength. Therefore, the process depicted in FIG. 4 is recursively executed (looped processing) at given time intervals. Information concerning a new combination is output to the baseband unit 123 only when the selected combination has changed since the previous communication session.

In the description above, a configuration in which one front end unit 122 is disposed for one communication scheme is taken as an example. However, configuration is not limited hereto and multiple front end units 122 may be disposed per one communication scheme. Further, one front end unit 122 may support multiple communication schemes. In these cases as well, by the same method above, a combination of the front end units 122 to be used for communication can be determined. Therefore, for example, without limitation to the above example of combinations of different communication schemes, different front end units 122 can be used by the same communication scheme and concurrent communication with the same or different base stations can be performed.

Figure 5:
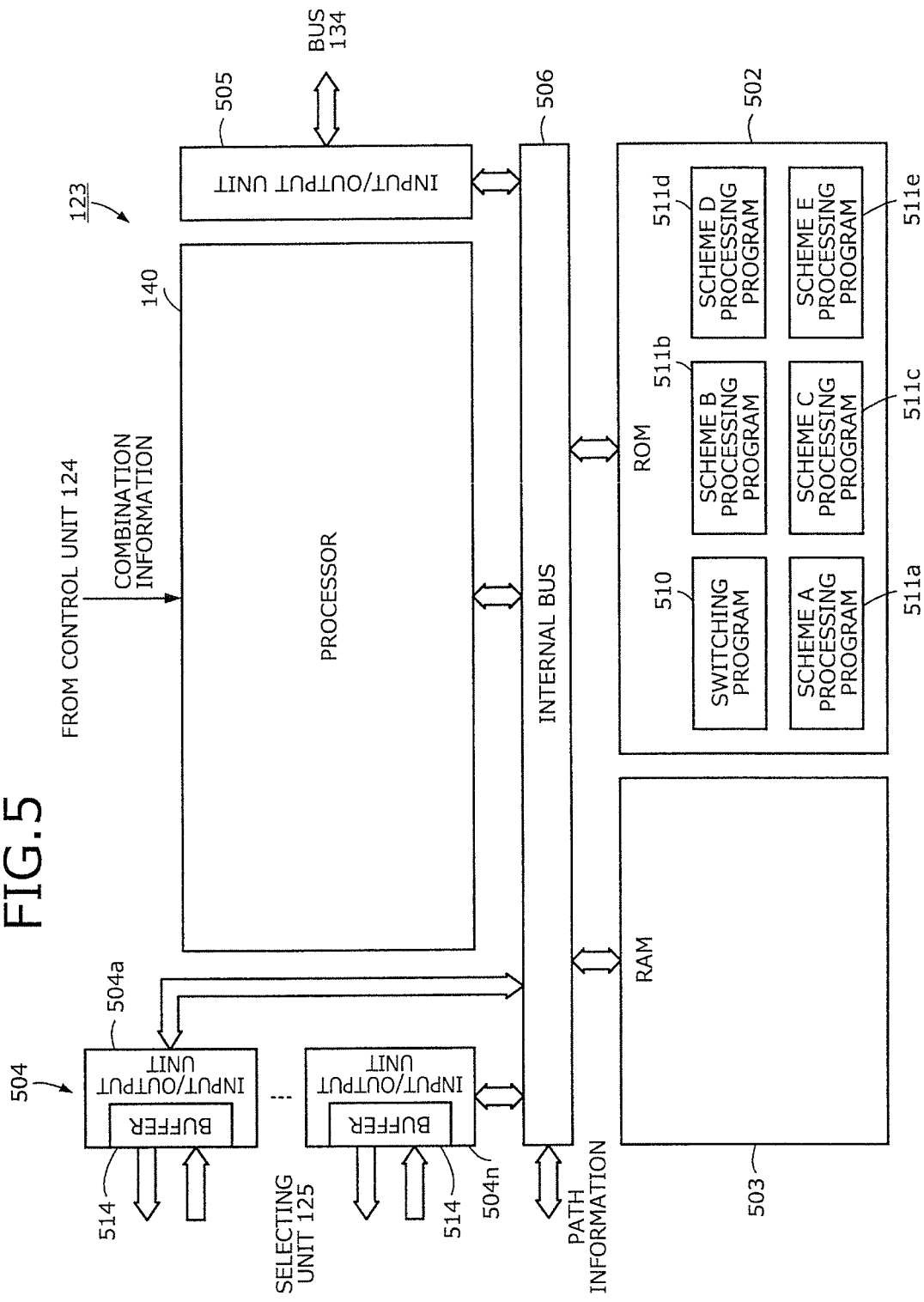
FIG. 5 is a diagram depicting an example of an internal configuration of a baseband unit according to the first embodiment.

FIG. 5 is a diagram depicting an example of an internal configuration of the baseband unit according to the first embodiment. The baseband unit 123 includes the processor 140, ROM 502, RAM 503, an input/output unit 504 that is connected to the selecting unit 125, and an input/output unit 505 connected to the bus 134 of the data processing unit 103, respectively connected to an internal bus 506.

The processor 140 receives the combination information from the control unit 124. The input/output unit 504, which is connected to the selecting unit 125, is disposed in plural (504a to 504n). The input/output unit 504 includes a buffer 514 and data that is to be input/output is initially stored to the buffer 514. The number of the input/output units 504 is equivalent to the maximum number of combined communications schemes that the determining unit 124a can select. For instance, in the example of communication scheme combinations depicted in the FIG. 3, since the maximum number of communication schemes that can be combined is two, the number of the input/output units 504 disposed in two.

The ROM 502 is loaded with a switching program 510 and processing programs 511 (511a to 511e) that perform baseband processing for the communication schemes (schemes A to E). In other words, the processor 140 depicted in FIG. 5 has a single core and executes time-sharing processing. The processor 140 reads in and executes the switching program 510. The switching program 510 reads in one-at-a-time, the processing programs 511 (511a to 511e) that correspond to the communication schemes indicated by the combination information from the control unit 124, switches and executes the processing programs 511, and thereby, performs a communication process (baseband processing) for each communication scheme.

Figure 6:
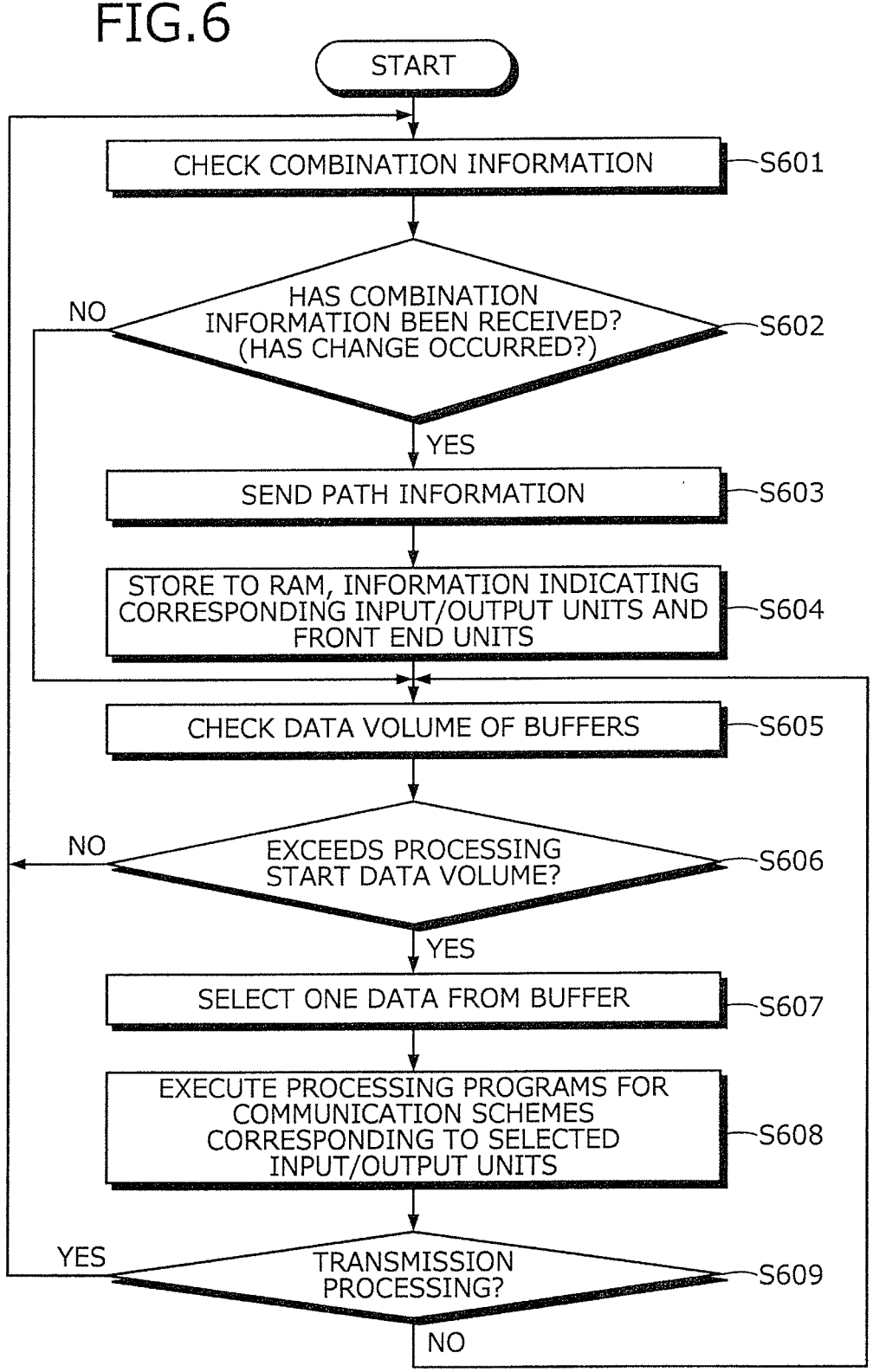
FIG. 6 is a flowchart depicting a process performed by the baseband unit according to the first embodiment.

FIG. 6 is a flowchart depicting a process performed by the baseband unit according to the first embodiment. FIG. 6 primarily depicts a switching process performed by the switching program 510 with respect to the processing programs 511 (511a to 511e).

The switching program 510 of the baseband unit 123 checks the combination information sent from the determining unit 124a in the control unit 124 (step S601). If new combination information has been received from the determining unit 124a (step S602: YES), the switching program 510 proceeds to step S603; and if new combination information has not been received (step S602: NO), the switching program 510 proceeds to step S605. In other words, when configuration is such that information concerning a new combination is output to the baseband unit 123 only when the combination selected by the control unit 124 (the determining unit 124a) has changed since the previous session, if the baseband unit 123 has not received new combination information, the baseband unit 123 executes processing according to the communication scheme combination indicated by the same combination information as the previous session.

At step S603, based on the new combination information received, the baseband unit 123 determines correspondence relations for connecting the front end units 122 and the input/output units 504, and sends the correspondence relations as path information to the selecting unit 125 (step S603). Based on the path information, the selecting unit 125 sets the connections of the front end units 122 and the input/output units 504. Here, the switching program 510 stores to the RAM 503, information indicating which input/output unit 504 (504a to 504n) is connected to which communication scheme front end unit 122 (122a to 122e) (step S604).

By the process above, the data of a radio signal received from the base station, via the antenna 101, is digitized and sent from the front end units 122 to input/output units 504. When a radio signal is transmitted, if data is written to the input/output units 504, the front end units 122 transmit the data to the base station.

The switching program 510 checks the volume of data accumulated in the buffers 514 of the input/output units 504 (step S605). When data is transmitted, if the available capacity of a buffer 514 exceeds a processing start data volume (step S606: YES), the switching program 510 selects one data from the buffer 514 (step S607). Thereafter, the processing programs 511 for the communication schemes corresponding to the input/output units 504 of the paths selected at step S603 are executed and data transmission processing is performed (step S608).

When the data transmission processing is performed (step S609: YES) and the session of transmission processing for the one data selected at step S607 ends, the switching program 510 returns to step S601 and immediately checks the combination information from the determining unit 124a (step S601), and then executes the operations at step S602 and thereafter.

The processing start data volume above is the data volume necessary to perform one session of processing by the baseband unit 123 for each communication scheme. The data volume for one session of processing is a data size (packet size) including appended information when data is divided and transmitted/received by radio communication; or is an integral multiple of this data size. Packet size is determined and fixed according to the type of communication scheme and therefore, the processing start data volume can be determined and fixed for each communication scheme. Further, the buffers 514 of the input/output units 504 are of a size that can accommodate the greatest processing start data volume among the communication schemes supported by the terminal 100.

On the other hand, when the terminal 100 receives data, at step S605, the switching program 510 checks the volume of data accumulated in the buffers 514 of the input/output units 504 (step S605). At step S606, if the volume of data accumulated in a buffer 514 exceeds the processing start data volume (step S606: YES), the switching program 510 selects one data from the buffer 514 (step S607). Thereafter, the processing programs 511 for the communication schemes corresponding to the input/output units 504 of the paths selected at step S603 are executed and data reception processing is performed (step S608).

When the data reception processing is performed (step S609: NO) and the session of reception processing for the one data selected at step S607 ends, the switching program 510 returns to step S605. If a buffer 514 is present whose accumulated data exceeds the processing start data volume, all of the data accumulated in the buffer 514 is processed and then, the switching program 510 returns to step S601 and checks the combination information.

When there is a change in the combination, the data remaining in the buffer 514 is discarded and again transmitted/received by the new combination of communication schemes.

At step S606, at the time of transmission, if no buffer 514 has an available capacity that exceeds the processing start data volume (step S606: NO), and at the time of reception, if no buffer 514 has a data volume that exceeds the processing start data volume (step S606: NO), the switching program 510 returns to step S601, without executing the operations at step S607 and thereafter. By the operations above, the processor 140 sequentially transmits/receives data by switching the communication schemes by time-sharing.

According to the first embodiment, the terminal performs communication by a combination of communication schemes. Baseband processing is performed by digital processing using a processor and therefore, the installation space for the baseband unit can be reduced. Further, from among communication schemes that can actually be used based on signal strength, etc., communication schemes suitable for the processing capability of the processor are selected, thereby enabling efficient use of the processor, improved communications capability by multiple communication schemes, and increased communication speed.

Figure 7:
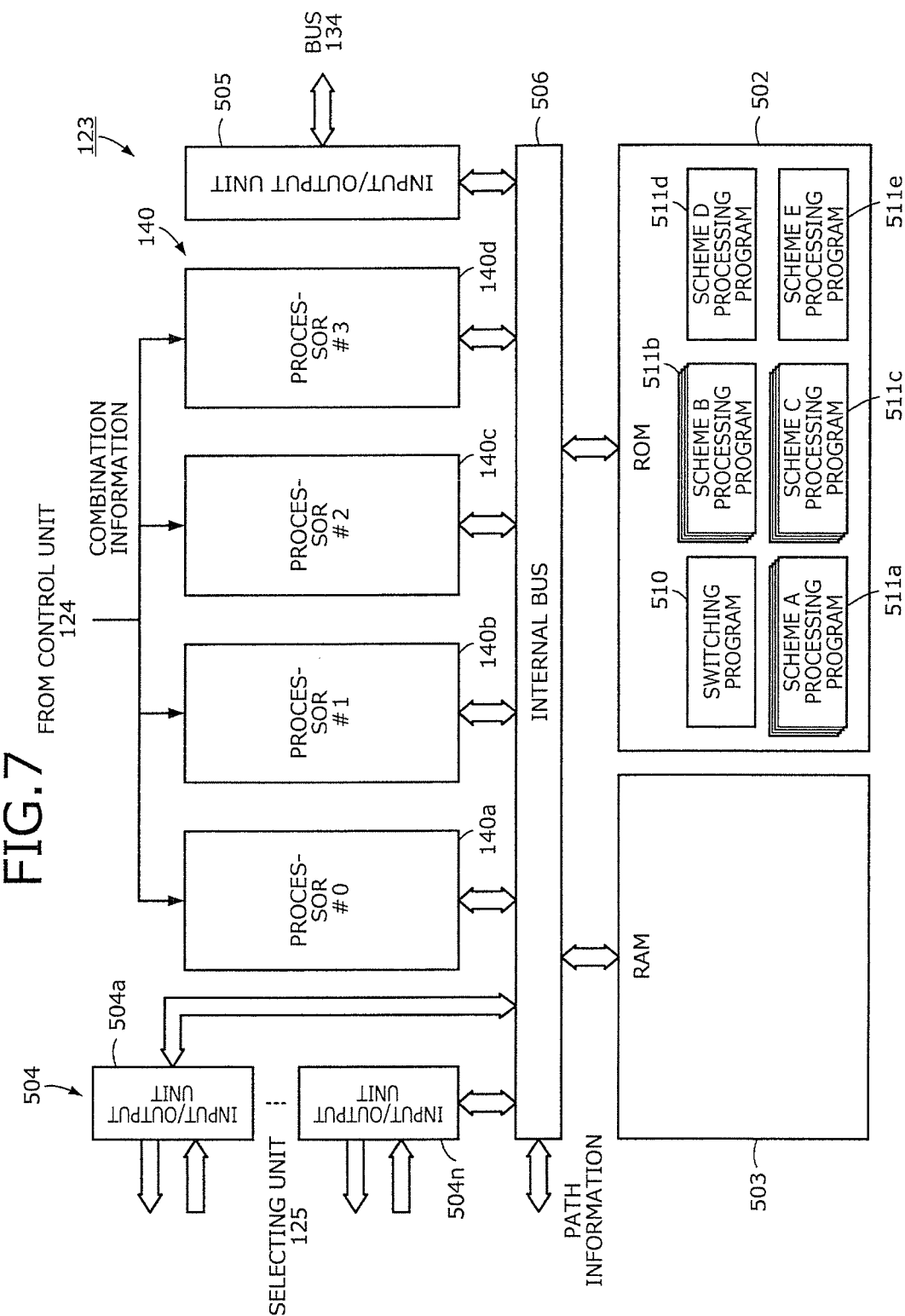
FIG. 7 is a diagram depicting an example of a configuration of the baseband unit according to a second embodiment.

In a second embodiment, another configuration of the baseband unit will be described. FIG. 7 is a diagram depicting an example of a configuration of the baseband unit according to the second embodiment. In the second embodiment, 123, the processor 140 (140a to 104d) is disposed in plural as the processor disposed in the baseband unit and the processors 140 (140a to 104d) are configured to perform concurrent parallel processing. Components excluding the processor 140 are identical to those in the first embodiment. In FIG. 7, although the processors 140 (140a to 104d) are depicted to be separate, a multicore processor in which multiple cores are included as a single package may be used and similar to first embodiment, the space for the processors 140 is saved.

The programs for communication processing and stored in the ROM 502, similar to the first embodiment, include the switching program 510 and the processing programs 511 (511a to 511e) for performing baseband processing for the communication schemes (scheme A to E). The processing programs 511 (511a to 511e) are divided into a number necessary to perform processing for the communication schemes (scheme A to E) in parallel by the processors 140 (140a to 140d). In other words, the processing programs 511 (511a to 511e) for the communication schemes respectively require a different number of processors and are respectively divided into a number segments corresponding to the number of required processors. Further, the switching program 510 may be a single program to be used by all of the processors 140 (140a to 140d).

In the first embodiment, the combination of communication schemes that can be used is determined based on the operating frequency of and the processing capability required of the processor 140. However, in the second embodiment, the combination of communication schemes that can be used is determined based on the number of processors 140 and the number of segments into which the program is divided.

For example, a segment count of the processing program for scheme A, i.e., the number of processors required by the processing program for scheme A is assumed to be 4; for scheme B, 3; for scheme C, 2; for schemes D and E, 1, respectively; and the number of disposed processors is assumed to be 4. In this case, possible communication scheme combinations are combinations that do not require more than a total of four processors, such as scheme A, scheme B, scheme C, scheme D, scheme E, schemes B+D, schemes B+E, schemes C+D+E, schemes C+D, schemes C+E, and schemes D+E.

Figure 8:
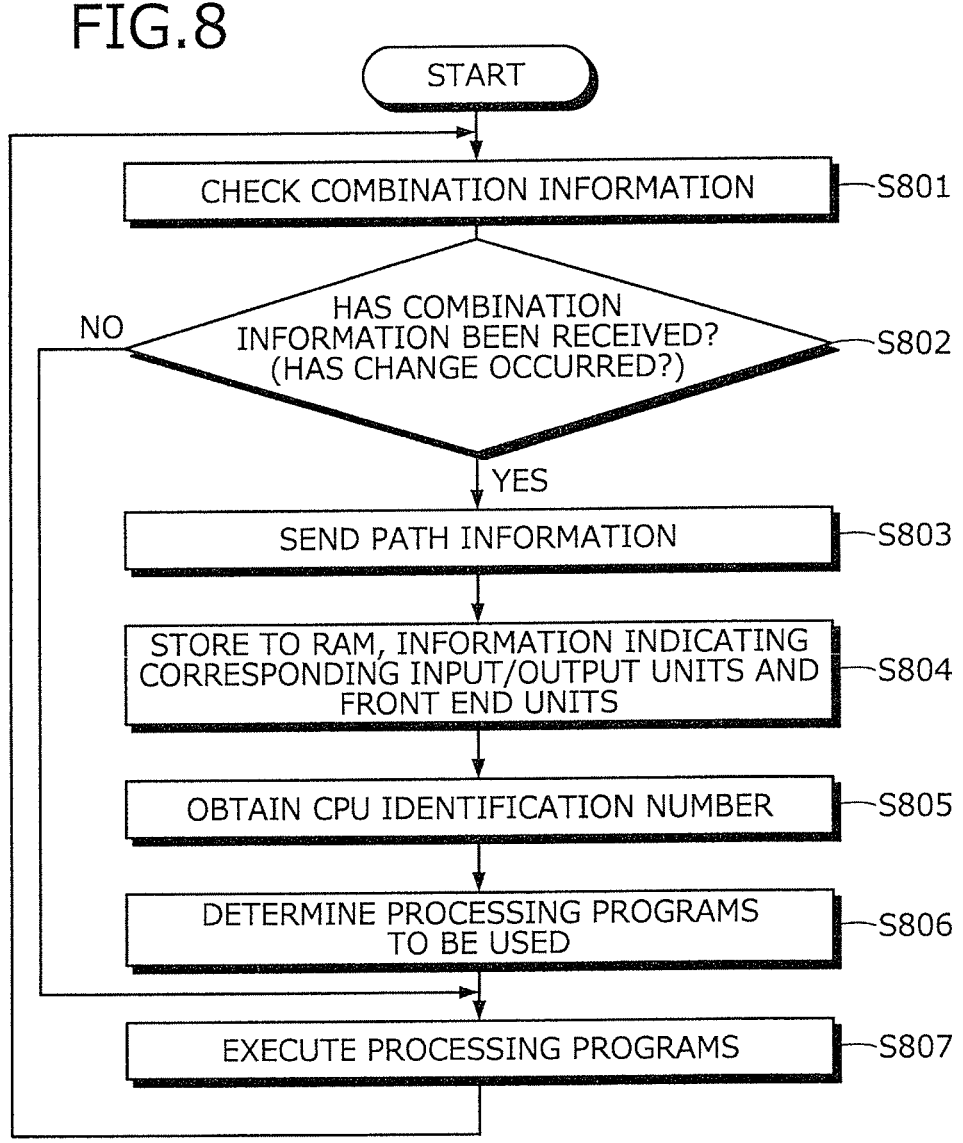
FIG. 8 is a flowchart depicting a process performed by the baseband unit according to the second embodiment.

FIG. 8 is a flowchart depicting a process performed by the baseband unit according to the second embodiment. The switching program 510 of the baseband unit 123 checks the combination information sent from the determining unit 124a in the control unit 124 (step S801). If new combination information has been received from the determining unit 124a (step S802: YES), the switching program 510 proceeds step S803; and if new combination information has not been received (step S802: NO), the switching program 510 proceeds to step S807.

At step S802 if new combination information has been received and there has been a change in the combination (step S802: YES), the switching program 510 determines correspondence relations for connecting the front end units 122 and the input/output units 504 based on the new combination information, and sends the correspondence relations as path information to the selecting unit 125 (step S803). Based on the path information, the selecting unit 125 sets the connections of the front end units 122 and the input/output units 504. Here, the switching program 510 stores to the RAM 503 information indicating which input/output unit 504 (504a to 504n) is connected to which communication scheme front end unit 122 (122a to 122e) (step S804).

The switching program 510 obtains the identification number of the processor 140 (step S805). The switching program 510 can distinguish the processors 140a to 140d by the identification numbers #0 to #3. The switching program 510 determines the assignment of the processing programs 511a to 511e to the processors 140a to 140d (step S806).

Determination of which processor 140 (140a to 140d) is to perform the processing for which communication scheme (scheme A to E) can be performed by preliminarily determining identification numbers for the communication scheme combinations or by making the determination by a simple rule(s).

For example, as depicted in the example of communication scheme combinations, a case may be considered where the combination of communication schemes is B+D; the required processor count for scheme B is three and the required processor count for scheme D is one. In this case, in ascending order of the identification numbers (#0 to #3), a first segment of the processing program 511b that is for scheme B and has been divided into three segments is assigned to processor #0(140a). A second segment of the processing program 511b that is for scheme B and has been divided in three segments is assigned to processor #1(140b); and a third segment of the processing program 511b for scheme B is assigned to processor #2(140c). The processing program 511d for scheme D is assigned to processor #3(140d).

The switching program 510 executes the processing programs 511a to 511e determined at step S806, by the processor 140 (140a to 140d) to which the processing program 511a to 511e is assigned (step S807). Thereafter, similar to the first embodiment, after performing processing for each unit of data, such as one packet, the switching program 510 returns to step S801 and checks the combination information.

According to the second embodiment, the terminal performs communication by a combination of communication schemes. Baseband processing is performed by digital processing using a processor and therefore, the installation space for the baseband unit can be reduced. Further, by parallel processing by multiple processors, concurrent communication by multiple communication schemes can be performed. Further, from among communication schemes that can actually be used based on signal strength, etc., communication schemes suitable for the processing capability of the processor are selected, thereby enabling efficient use of the processor, improved communications capability by multiple communication schemes, and increased communication speed.

Although in the first and second embodiments, the communication scheme combination is determined giving priority to processor performance, in a third embodiment, the communication scheme combination is further determined according to the power consumption of the processor 140. Therefore, the determining unit 124a selects the communication scheme independently having the highest effective communications capability; and determines the rate of communication performance improvement and the rate that power consumption by combinations that include the communication scheme increases.

From among combinations that exceed a value (e.g., a value of 1 or more) that indicates that both the rate of improved communication performance and the rate of increased power consumption to the rate of improved communication performance increase, the determining unit 124a selects the combination having the greatest rate of increased power consumption to communication performance improvement. Further, if the rate of improved communication performance and the rate of increased power consumption to the rate of improved communication performance do not both exceed 1 for any combination, no increase is expected and therefore, the determining unit 124a selects the communication scheme independently having the highest effective communications capability.

The rate of improved communication performance is the rate of increase of the effective communications capability when the communication scheme is combined with another scheme. For example, scheme A is assumed to independently have the highest effective communications capability. In this case, if the effective communications capability of scheme A independently is NA and the effective communications capability of scheme B is NB, then the effective communications capability of schemes A+B is NA+NB and the rate at which scheme A contributes to the improvement of the communication performance for schemes A+B can be obtained by (NA+NB)÷NA. In this case, if 1 is exceeded, the respective increases are expected.

Further, the amount of power consumption per unit data amount by the communication schemes can be obtained by "the amount of power consumption per unit time by a communication scheme"÷"the communication amount per unit time by the communication scheme". "The communication amount per unit time" indicates the effective communications capability.

Further, "the amount of power consumed per unit time by the communication scheme" is obtained by "the amount of power consumption per unit time by the processor"×"the processing capability required by the switched communication scheme"÷"the operating frequency of the processor", when one processor 140 is switched and processing that is communication scheme specific is performed as in the first embodiment. On the other hand, when the processing for the communication schemes is assigned to multiple processors 140 (140a to 140d) and performed as in the second embodiment, "the amount of power consumed per unit time by the communication scheme" is obtained by "the amount of power consumption per unit time by one processor"×"the number of processors required by the communication scheme".

For example, when the amount of power consumption per unit time by scheme A is assumed to be WA, the amount of power consumption per unit time by scheme B is assumed to be WB, and the amount of power consumption per unit time by schemes A+B is assumed to be WAB, the amount of power consumption per unit data is WA÷NA for scheme A, WB÷NB for scheme B, and (WA+WB)÷(NA+NB) for schemes A+B. Further, the ratio of the power consumption increase for scheme A+B consequent to scheme A is obtained by ((WA+WB)÷(NA+NB))÷(WA÷NA). The rate of increased power consumption to the rate of improved communication performance is obtained by "the rate of communication performance improvement"÷"the rate of increased power consumption".

Figure 9:
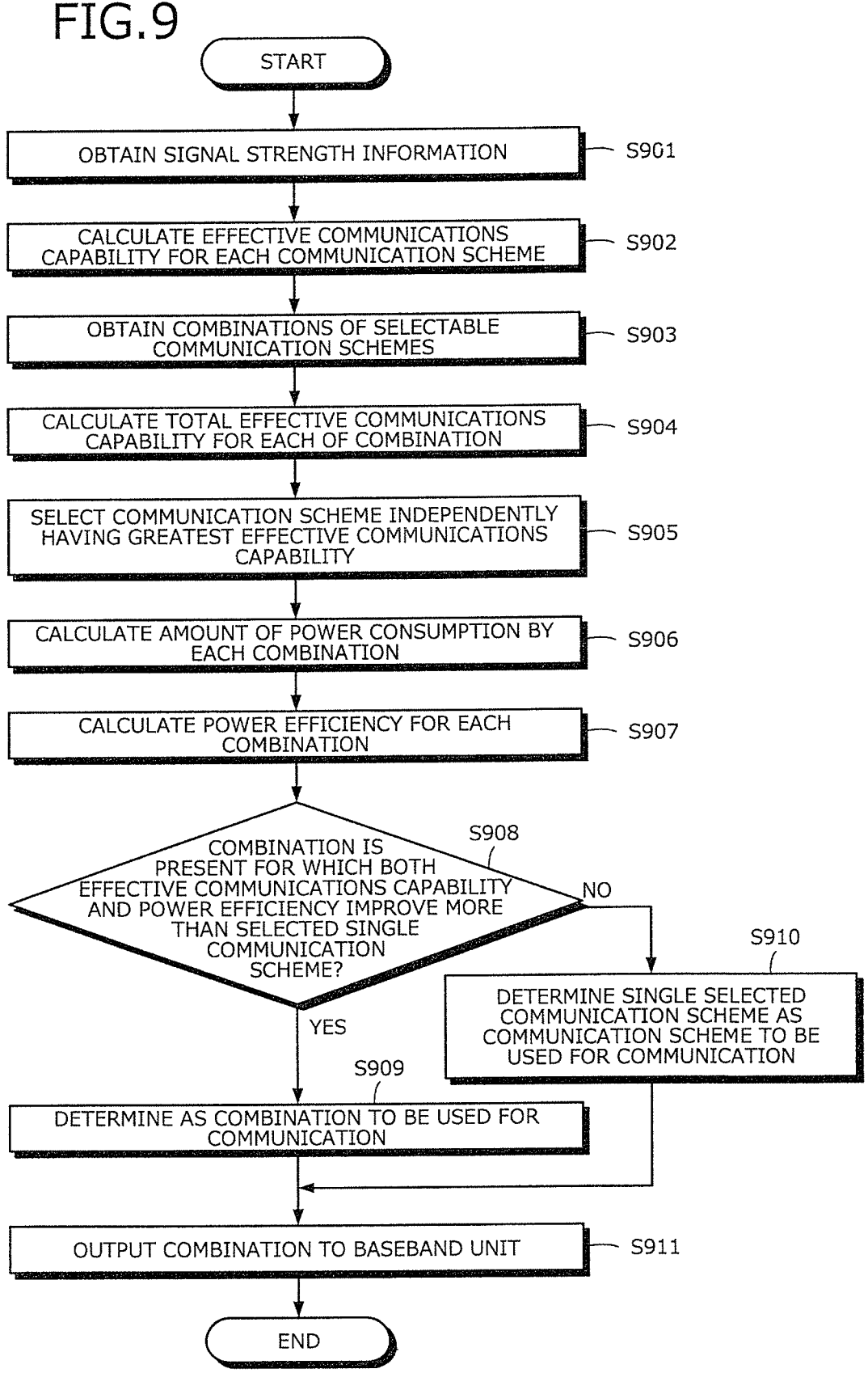
FIG. 9 is a flowchart depicting the communication scheme selection process according to a third embodiment.

FIG. 9 is a flowchart depicting the communication scheme selection process according to a third embodiment. The determining unit 124a obtains the signal strength information for a communication signal from the front end units 122 (122a to 122e) that are disposed corresponding to the communication schemes (schemes A to E) (step S901). The determining unit 124a refers to the settings in the storage unit 124b, obtains the relationship between measured signal strength and the logic communications capability of each communication scheme (refer to FIG. 2), and calculates effective communications capabilities for the communication schemes (step S902).

The determining unit 124a refers to the settings in the storage unit 124b and obtains combinations of communication schemes (schemes A to E) that can be selected by the terminal 100 (refer to FIG. 3) (step S903). The determining unit 124a calculates the total effective communications capability for each of the combinations obtained at step S903 (step S904). The determining unit 124a selects the communication scheme (scheme A in the example above) having independently the greatest effective communications capability among the combinations (step S905).

The determining unit 124a calculates the amount of power consumption by each of the combinations that include the scheme selected at step S905 (step S906) and calculates power efficiency for each of the combinations (step S907).

The determining unit 124a determines whether a combination is present for which both the effective communications capability and the power efficiency improve more than the selected single communication scheme (step S908). In the example above, when scheme A has independently the highest effective communications capability, comparison is made with a combination of schemes A+B. If a combination is present for which both the effective communications capability and power efficiency improve more than the selected single communication scheme (step S908: YES), the combination (schemes A+B in the example above) is determined as the combination to be used for communication (step S909). On the other hand, if no combination is present for which the effective communications capability and power efficiency improve more than the selected single communication scheme (step S908: NO), the determining unit 124a determines the single communication scheme selected at step S905 as the communication scheme (scheme A) to be used for communication (step S910).

Subsequent to the operation at step S909 or step S910, the determining unit 124a (the control unit 124) outputs to the baseband unit 123, the combination information (for each communication scheme to be used for communication) corresponding to the selection (step S911), and ends the process. The process depicted in FIG. 9 is recursively executed (looped processing) at given time intervals. Information concerning a new combination is output to the baseband unit 123 only when the selected combination has changed since the previous communication session.

According to the description above, the communication scheme that is fastest independently is used as a comparison reference. By simply comparing power efficiency, a scheme is selected whose communication speed is slow and whose power consumption is low and therefore, in principle, to facilitate improved communication speed, a combination is selected that is faster than the fastest single communication scheme.

Thus, according to the third embodiment, if a communication scheme combination that has higher communication performance and higher power efficiency than the fastest single communication scheme, the communication scheme combination is selected, thereby enabling the communication speed and the power efficiency to be improved and high-speed communication to be performed with low power consumption.

In the first embodiment, the processing capability required when communication schemes are combined is calculated by simply summing the required processing capability of each communication scheme. However, as in the first embodiment, when a single processor 140 switches and executes the processing programs 511a to 511e, respectively, processing for such switching arises, such as processing to reload a subsequent processing program 511a to 511e from the ROM 502. Therefore, in a fourth embodiment, an optimal communication scheme combination is obtained, including overhead for switching the processing programs 511a to 511e.

The magnitude of overhead does not greatly vary according to the types of the communication schemes before and after a switch and therefore, the magnitude of overhead can be measured in advance. If the processing capability required by scheme A is assumed to be fA, the processing capability required by scheme B is assumed to be fB, and the magnitude of overhead is assumed to be fO, in this case, if schemes A and B are combined, two switches occur (a switch from scheme A to scheme B, and a switch from scheme B to scheme A. The required processing capability in this case is fA+fB+(fO×2). If three communication schemes are combined, the required processing capability can be calculated by fA+fB+fC+(fO×3) and therefore, calculation can be performed by multiplying overhead by the number of combined communication schemes.

Further, the overhead itself is power consumption. The amount of power consumption per unit time for overhead can be calculated by "the amount of power consumption per unit time by the processor"×"overhead"÷"the operating frequency of the processor". Therefore, if the calculated amount of power consumed is assumed to be WO, the amount of power consumption per unit data for schemes A+B described in the third embodiment is calculated by (WA+WB+(WO× 2))÷(NA+NB). Thus, an optimum communication scheme combination, including overhead, can be determined.

Figure 10:
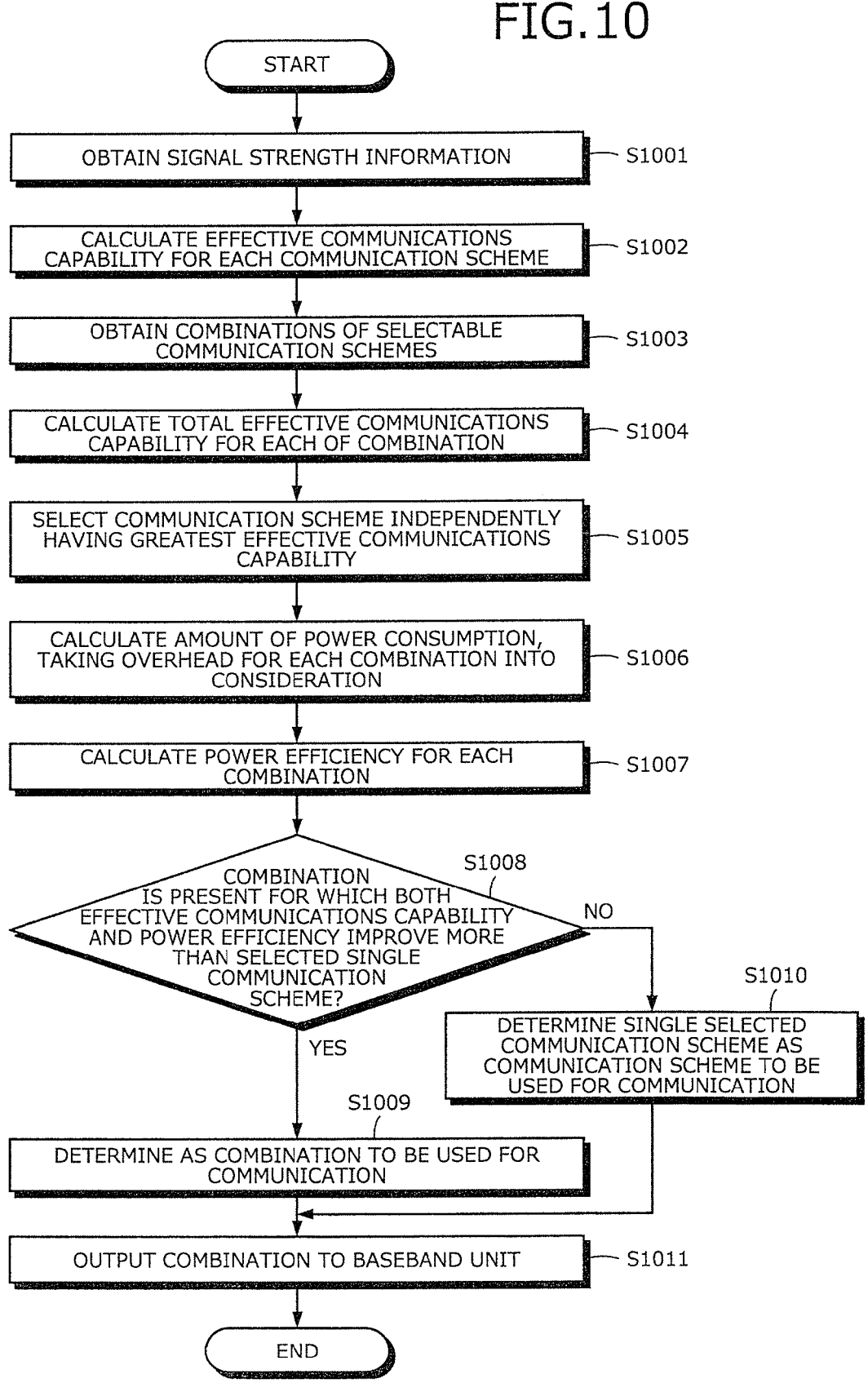
FIG. 10 is a flowchart depicting the communication scheme selection process according to a fourth embodiment.

FIG. 10 is a flowchart depicting the communication scheme selection process according to the fourth embodiment. The operations at steps S1001 to S1011 in FIG. 10 are basically the same operations as those at steps S901 to S911 in FIG. 9. An operation that differs occurs when communication scheme combinations are obtained at step S1003. Combinations of selectable communication schemes are obtained based on the required processing capability calculated taking overhead into consideration. When the amount of power consumption is calculated at step S1006, the amount of power consumption is calculated for each communication scheme combination, taking the overhead above into consideration.

Differences between a configuration that takes overhead into consideration in the fourth embodiment and configurations of the other embodiments are summarized. A condition concerning the communication schemes that can be combined is that "the CPU processing capability"≥"the total required processing capability" in the first and the third embodiments. Whereas, in the fourth embodiment, a condition is that including overhead, "the CPU processing capability"≥"the total required processing capability"+ "overhead"×("the number of combined schemes"−1).

An equation for calculating the amount of power consumption is "the amount of power consumption per unit time by the CPU"×"the total required processing capability"÷"the CPU processing capability" in the third embodiment, whereas in the fourth embodiment including overhead, the equation is "the amount of power consumption per unit time by the CPU"×("the total required processing capability"+"overhead"×("the number of combined schemes"−1))÷"the CPU processing capability".

According to the fourth embodiment, if a communication scheme combination that has higher communication performance and higher power efficiency that the fastest single communication scheme, the communication scheme combination is selected, thereby enabling the communication speed and the power efficiency to be improved and high-speed communication to be performed with low power consumption. The amount of power consumed and the processing capability required of a processor are obtained, where the required processing capability includes the overhead for switching on the single processor upon execution, processing programs that correspond to the communication schemes. Thus, in a configuration that switches programs, even if overhead arises, such overhead is considered, enabling the communication speed and power efficiency to be improved.

According to the embodiments above, a processor is used to commonly perform baseband processes for multiple communication schemes, thereby enabling size reductions of the terminal as installation space for circuits of the baseband unit is not consumed. By combining communication schemes that can improve communication speed to perform concurrent communication, the communication speed can be improved. In this case, a communication scheme combination that can improve communication speed is selected with consideration of processor performance, whereby communication can be performed that efficiently uses the processor performance.

Further, by selecting a communication scheme combination based on power consumption and the overhead that arises with program switching, the processing capability of the processor can be more realistically calculated, enabling communication having improved processing capability and power efficiency to be performed, and low power consumption of the terminal to be facilitated.

According to the communication method and the communications apparatus, without increases in circuit size, size reductions are possible and improvement of communication efficiency by concurrent communication via multiple communication schemes is facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method comprising:
performing, by a processor, digital processing for multimode radio communication by a plurality of communication schemes;
obtaining power efficiency based on an effective communications capability and a required processing capability required of the processor, for each communication scheme among the plurality of communication schemes;
selecting, from among the plurality of communication schemes, one communication scheme for which the effective communications capability is highest; and
performing concurrent communication using a combination of the selected one communication scheme and another communication scheme among the plurality of communication schemes, when a sum of effective communications capabilities and a sum of power efficiencies for the combination both improve.

2. The communication method according to claim 1, further comprising obtaining power efficiency based on power consumption by the processor when a given unit of data is communicated.

3. The communication method according to claim 1, further comprising obtaining a processing capability of the processor, to include overhead for program switching, when the processor performs the digital processing for the plurality of communication schemes by time-sharing processing via the program switching.

4. The communication method according to claim 1, wherein
a plurality of the processors is provided and the plurality of the processors performs the digital processing for the plurality of communication schemes by parallel processing, and
programs of a number corresponding to a processing capacity required by each among the plurality of communication schemes are assigned to the plurality of processors.

5. The communication method according to claim 1, further comprising obtaining an effective communications capability based on logic communications capability of the plurality of communication schemes and measured signal strength.

6. A communications apparatus comprising:
a baseband unit configured to perform, by a processor, digital processing for multimode radio communication by a plurality of communication schemes; and
a control circuit configured to:
obtain power efficiency based on an effective communications capability and a required processing capability required of the processor, for each communication scheme among the plurality of communication schemes;
select, among the plurality of communication schemes, one communication scheme for which the effective communications capability is highest; and
perform concurrent communication using a combination of communications schemes including the selected one communication scheme and another communication scheme among the plurality of communication schemes, when a sum of effective communications capabilities and a sum of power efficiencies for the combination both improve.

7. The communications apparatus according to claim 6, wherein the processor is a single core processor configured to perform the digital processing for the plurality of communication schemes by time-sharing via program switching.

8. The communications apparatus according to claim 6, wherein the processor is a multicore processor configured to perform the digital processing for the plurality of communication schemes by parallel processing.

* * * * *